Patented Oct. 13, 1931

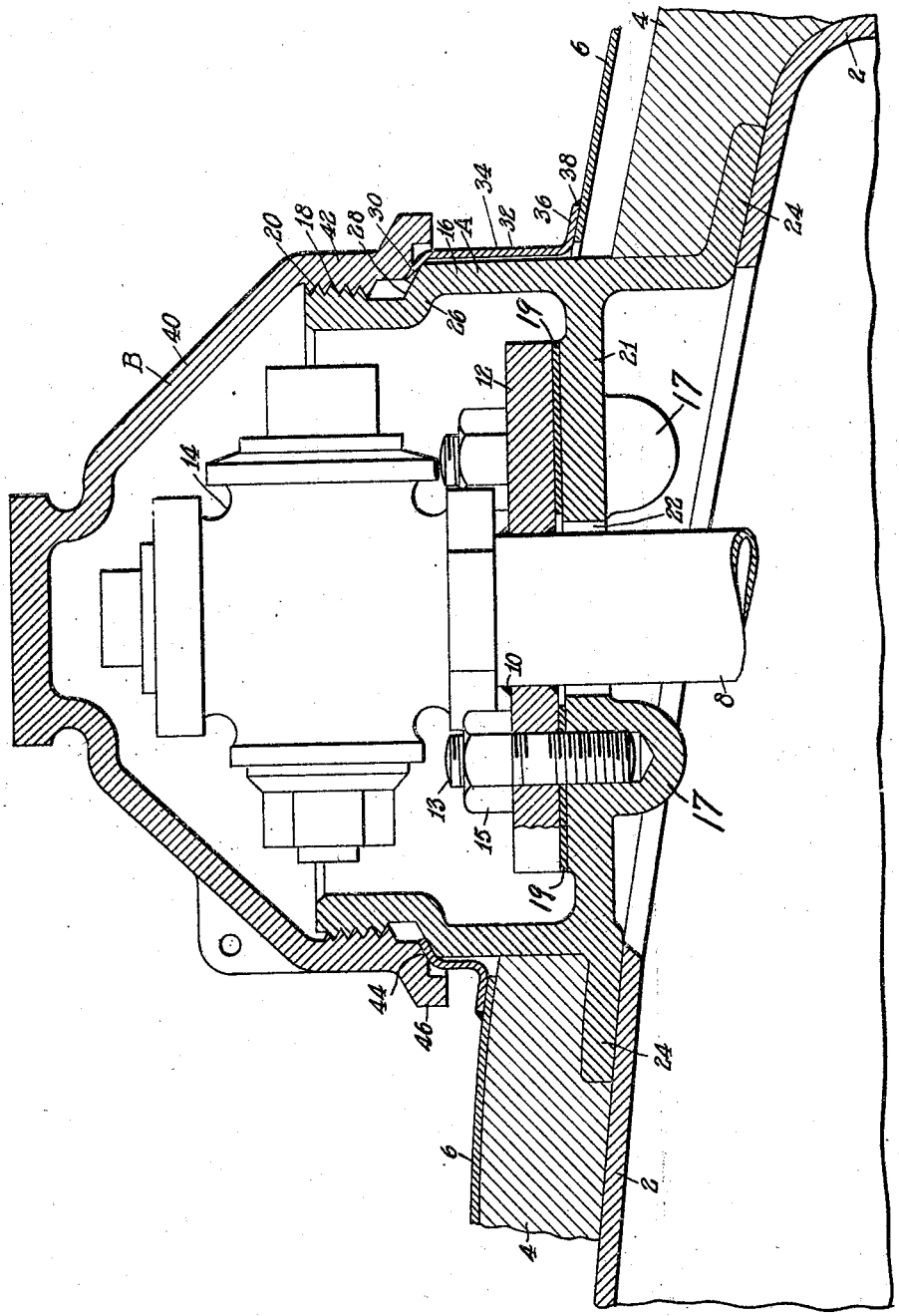

1,827,393

UNITED STATES PATENT OFFICE

CHARLES I. HUMMER, OF JERSEY CITY, NEW JERSEY, ASSIGNOR TO AMERICAN CAR AND FOUNDRY COMPANY, OF NEW YORK, N. Y., A CORPORATION OF NEW JERSEY

CONTAINER CONSTRUCTION

Application filed January 30, 1930. Serial No. 424,568.

This application relates generally to containers, such as insulated tanks (for example car tanks) and has particular reference to a means for effecting a leak-proof joint between a housing for tank fittings and the outer sheathing of the container. Containers such as car tanks are often insulated, and the usual car tank is provided with a dome through the head of which tank fittings, such as relief valves, loading and unloading pipes, etc., extend. Usually these fittings are normally concealed within a housing in order that they may be protected from the elements and also so that unauthorized tampering therewith will be prevented. When the tank is insulated, difficulties arise in connecting the outer sheathing to these fitting housings in such a manner as to prevent leakage of water to the insulation. It will be apparent that it is unwise to permit insulation to become water-saturated and to prevent the leakage of water, the present invention has been designed.

One object of the present invention therefore is the provision of a means for sealing the joint between the housing for tank fittings and the sheathing whereby to provide a construction in which leakage of water to the insulation is prevented.

Another object of this invention is the provision of a new and improved housing for tank fittings.

A further object of the present invention is the provision of a housing for tank fittings, in which the use of a sealing gasket is eliminated.

A still further object of this invention is the provision of a housing for tank fittings which is so constructed as to prevent leakage of gas therefrom.

Another object of the present invention is the provision of a means for effecting a leak-proof joint between the housing for tank fittings and the outer sheathing of an insulated car tank in which leakage of water to the insulation is prevented but which is so formed that the sheathing around the housing may be easily removed to permit replacement or repair thereof or of the insulation.

Other objects and advantages of this invention will be apparent from the following description taken in conjunction with the accompanying drawing in which:

The figure is a sectional view of a portion of the dome of a car tank or other container, showing the housing and joint of the present invention; and also showing a conventional tank fitting, the latter being shown in side elevation.

The drawing discloses a portion of a tank dome head which is indicated at 2, the dome having insulation 4 which latter is covered by an outer sheathing 6. Tank fittings extend through the dome head 2 and in the present instance there is shown a pipe 8 which may be a loading or unloading pipe, and which is welded at 10 to a support 12, mounted on a partition (hereinafter described) of a housing, also to be hereinafter described. The pipe is shown as having a valve 14 at its upper end. While the drawing shows a pipe and valve it is to be understood that these parts are merely by way of example.

The tank fitting is enclosed within a housing comprising a body portion A and a cap B threadedly secured thereto. The portion A is a substantially cylindrical casting comprising a side wall 16 having an offset or reduced upper end 18, externally threaded as at 20 to engage internal threads at the lower end of the cap B. The body portion A is provided with a base or internal partition 21 having an opening 22 therein through which the pipe 8 extends. The support 12 is secured to the partition 21 by bolts 13 which are threaded into tapped lugs 17 formed on the lower face of the partition and a gasket 19 is interposed between the support 12 and the partition. The support 12 is provided with an opening through which pipe 8 extends, and said pipe is preferably welded as at 10 to the support.

The lower edge of the wall 16 is provided with an outwardly extending flange 24 which is conformed to the shape of, or to be more specific, to the slope of the dome head 2 and said flange 24 is secured to the dome head 2 in any suitable manner as by being welded or riveted to the head. As shown, the insulation 4 extends to and surrounds the wall 16 for a portion of the height of the latter. The reduced end 18 of the wall 16 provides an offset 26, thus defining an annular shoulder 28 which is preferably machined to furnish a seat for the flanged upper edge 30 of a flashing indicated generally at 32.

The flashing 32 is annular in shape and the depth thereof conforms, of course, to the form of the sheathing, said flashing being substantially Z-shaped in cross section and comprises a web 34, and a lower chord or outwardly extending flange 36 secured to the sheathing edge adjacent an opening therein through which the body portion A extends; the securing means in the present instance being a weld 38. The chord of the Z-shaped section comprises the flange 30 heretofore described which overlies the machined shoulder 38.

The cap B may be of any general shape but is shown as having an upwardly tapered top portion 40 and a side wall 42, the lower end of the latter being provided with an internally arranged machined seat 34 and with an outwardly offset lower flange 36. The cap is provided with internal threads to secure the cover to the reduced upper end of the body portion A. The parts are so proportioned that when the cover or cap B is in position the seat 44 will engage the flange 30 of the flashing, and the flange 46 of the cover skirts the flashing as clearly shown in the drawing.

After the sheathing 6 has been applied to the insulation 4; the housing having been previously attached to the dome head 2, the flashing 32 is placed in position around the body portion A and it is welded to the sheathing 6 as shown at 38. It is apparent that the flashing which is an annulus can be slipped over the body portion A into its proper position, and the flange 30 of the flashing will overlie and preferably rest upon the machined seat or shoulder 28. When the cap B is applied it is screwed down on the body portion A and the seat 44 will be urged against the flange 30 and hence a tight seal will be formed entirely around the shoulder 28 thereby providing a sealed joint which effectually prevents the admission of water to the insulation 4. It will also be apparent that in addition to the feature just mentioned the tight seal established by the seats 28 and 44 with the flange 30 prevents the escape of any gas which may have leaked from the tank into the housing through the valve or through any opening which may be present from the interior of the dome into the housing.

The drawing describes one form of the invention but it is to be understood that the drawing is for illustrative purposes only and that various changes in the form and proportions of the device may be made within the scope of the appended claims without departing from the spirit of the invention.

What is claimed is:

1. In a container, a housing extending through the upper wall thereof and having an externally arranged annular shoulder, a cap forming a part of the housing and provided with an internally arranged seat adjacent its lower edge, and an annular flashing secured to the upper wall of the container and surrounding the housing, said flashing having an inturned annular flange overlying the shoulder and clamped between the shoulder and seat.

2. In an insulated container, an outer sheathing, a housing body portion extending above the sheathing, a cap for the housing, and means forming a joint between the sheathing and the body portion comprising a flashing secured to the sheathing around the housing and having an upper annular flange overlying a body portion part and clamped between said housing part and the cap by said cap.

3. In an insulated container, an outer sheathing, a housing body portion extended through the sheathing and having a shoulder formed intermediate the top and bottom edges thereof, a flashing secured to the sheathing and having its upper edge overlying said shoulder, and a housing cap secured to the body portion and provided with an annular seat adjacent its lower end for engagement with the overlying portion of the flashing.

4. In an insulated container, an outer sheathing, a housing body portion extended through the sheathing and having an external shoulder formed intermediate its top and bottom edges, a flashing surrounding the housing body portion and secured to the sheathing and having its upper edge overlying said external shoulder, and a housing cap threadedly engaged with the body portion and provided with an internal annular seat adjacent its lower end adapted to engage the overlying portion of the flashing to form a sealed joint with the housing, whereby to seal the insulation against the entrance of foreign matter.

5. In an insulated container, an outer sheathing, a housing extended through the sheathing and provided with a removable cap, said housing and cap each being formed with an annular seat which, when the cap and housing are assembled are opposite each other, and a flashing welded to the sheathing and arranged around the sheathing and having an inturned annular flange at its upper edge arranged between the seats and held against shifting by the housing cap.

6. In a container, a fitting housing secured thereto and having an offset upper end, a flashing arranged around the housing with its upper edge overlying the offset, and a cap detachably secured to the housing provided with an offset lower end, the offsets of the housing and cap being adjacently arranged whereby to clamp the upper edge of the flashing therebetween.

7. In a container, a fitting housing secured thereto provided with an external annular shoulder, a flashing secured to the container with its upper edge overlying the shoulder, and a cap detachably secured to the housing and clamping the upper edge of the flashing to the shoulder in a plane above the lower edge of the cap whereby said cap serves as a watershed for the joint between the upper edge of the flashing and the housing.

8. In a container, a housing secured thereto provided with an offset upper end, a cap detachably secured to the offset end and having its lower end offset, the offsets defining adjacently arranged seats, a flashing secured to the container around the housing with its upper end arranged between the seats and retained against shifting by said cap, the offset portion of the cap defining a watershed.

9. In a container, a fitting housing secured thereto provided with an annular shoulder, a cap detachably connected to the housing and having an internal clamping surface arranged in a plane above the lower edge of said cap, a flashing secured to the upper wall of the container around the housing and having its upper edge arranged over the shoulder and clamped in position by said clamping surface whereby the joint between the upper end of the flashing and the housing is concealed by the cap.

10. In a container, a fitting housing having an external annular shoulder, a flashing secured to the container around the housing with its upper edge in overlapping relation with respect to the shoulder, and means securing the flashing whereby the joint between the housing and flashing is concealed comprising a cap detachably connected to the housing and provided with an internal annular shoulder located in a plane above the lower edge of the cap adapted to engage the upper edge of the flashing.

11. In a container, a fitting housing having an external annular shoulder, a flashing secured to the container around the housing with its upper edge in overlapping relation with respect to the shoulder, and means securing the flashing whereby the joint between the housing and flashing is concealed comprising a cap detachably connected to the housing and provided with an internal annular shoulder located in a plane above the lower edge of the cap adapted to engage the upper edge of the flashing, the lower edge of the cap being offset to define a watershed.

In witness whereof I have hereunto set my hand.

CHARLES I. HUMMER.